United States Patent [19]

Sisto

[11] Patent Number: 4,789,129

[45] Date of Patent: Dec. 6, 1988

[54] ADJUSTABLE MOLD FOR FORMING CONTAINERS

[75] Inventor: Eugene Sisto, Spencerport, N.Y.

[73] Assignee: Eastman Kodak Company, Rochester, N.Y.

[21] Appl. No.: 85,447

[22] Filed: Aug. 14, 1987

[51] Int. Cl.⁴ .............................................. B29C 51/30
[52] U.S. Cl. .................................... 249/102; 249/141; 249/155; 249/161; 425/388
[58] Field of Search ............... 249/102, 155, 157, 158, 249/160–163, 141; 425/330, 387.1, 388

[56] References Cited

U.S. PATENT DOCUMENTS

| | | | |
|---|---|---|---|
| 1,591,558 | 7/1926 | Pike | 249/155 |
| 2,133,675 | 10/1938 | Ten Bosch | 425/330 |
| 3,002,250 | 10/1961 | Huet | 25/121 |
| 3,635,642 | 1/1972 | Mueller | 425/470 |
| 4,156,516 | 5/1979 | Oliver | 249/53 R |
| 4,637,789 | 1/1987 | Netznik | 425/89 |

*Primary Examiner*—Jay H. Woo
*Assistant Examiner*—James C. Housel
*Attorney, Agent, or Firm*—William C. Dixon

[57] ABSTRACT

A rapidly adjustable mold for thermoforming plastic sheet material into different-sized containers is disclosed. The mold comprises a bottom wall and four orthogonally oriented, readily moveable sidewalls, which together define a mold cavity that is rapidly adjustable to produce rectangular containers of various sizes and aspect ratios. The first sidewall extends from a bottom wall corner and alongside a first bottom wall edge; and is vertically moveable but horizontally stationary. The second sidewall extends from the same corner but alongside a second bottom wall edge perpendicular to the first; and is both vertically moveable and horizontally moveable along the second edge. The third sidewall extends perpendicularly from an end of the second sidewall and parallel with the first sidewall over the bottom wall; and is vertically stationary but horizontally moveable in directions parallel with both edges. The fourth sidewall extends perpendicularly from an end of the third sidewall and parallel with the second sidewall, over the bottom wall, and perpendicularly to the first sidewall; and is vertically stationary but horizontally moveable in directions parallel with the first edge. With suitably mechanized actuators for moving the sidewalls, mold cavity size can be changed rapidly, between associated machine indexes if desired, to quickly accommodate a required change in container dimensions. Exemplary container manufacturing processes using such a mold also are disclosed.

6 Claims, 4 Drawing Sheets

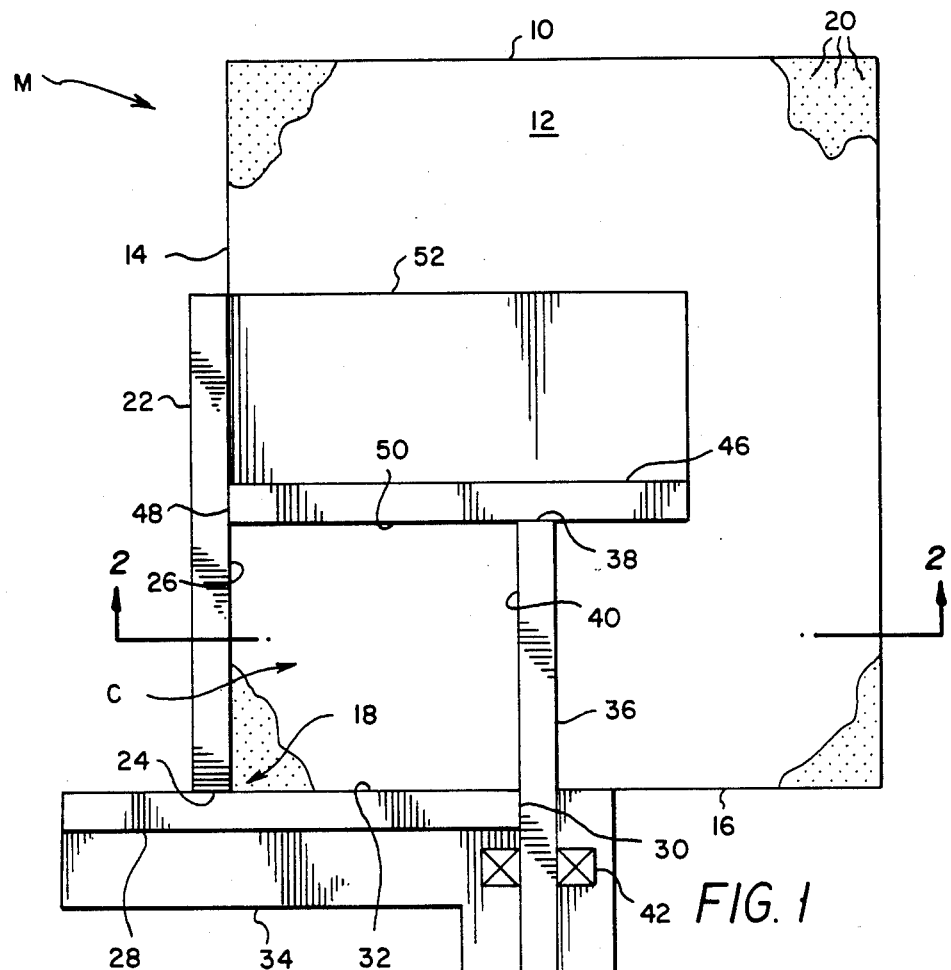
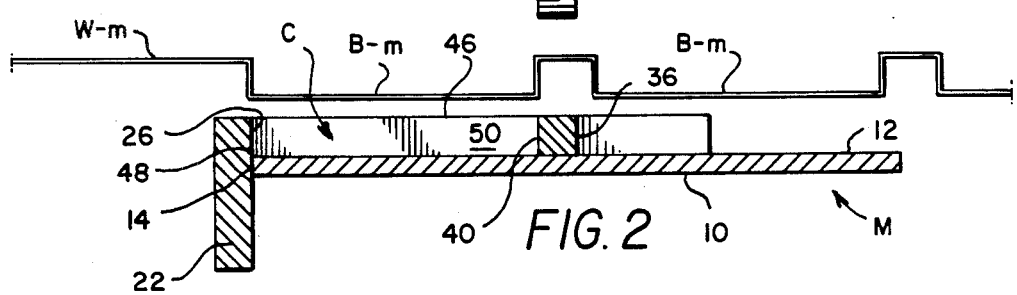

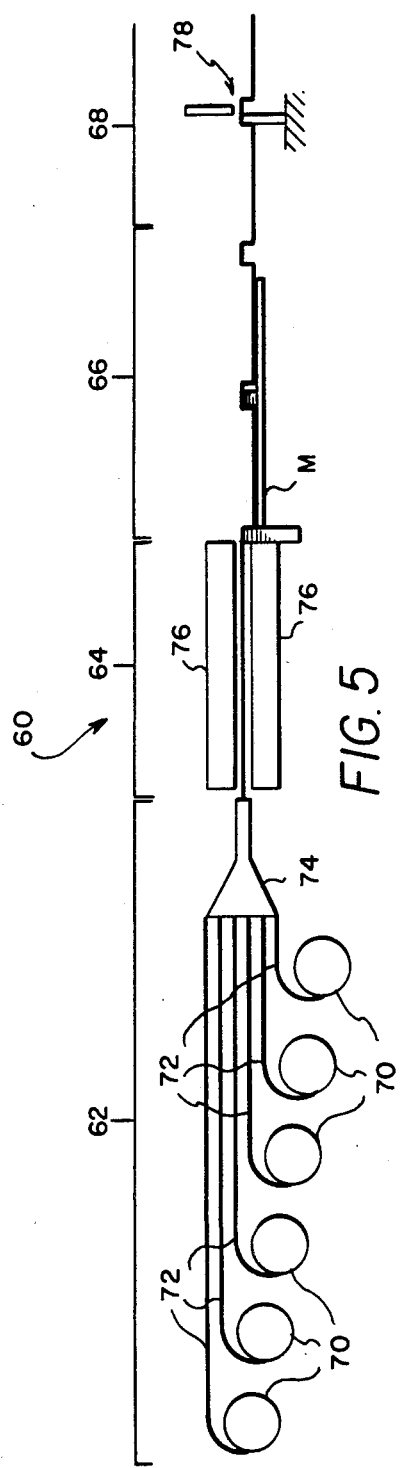
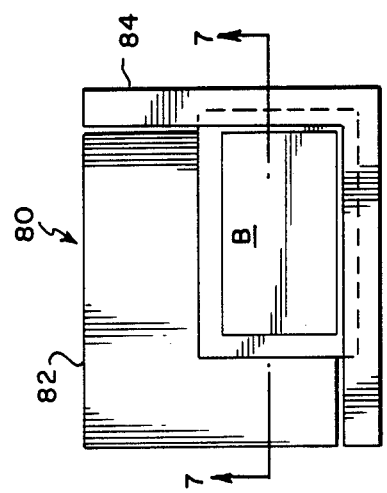
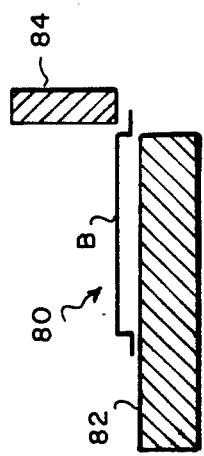
FIG. 5
FIG. 6
FIG. 7

ADJUSTABLE MOLD FOR FORMING CONTAINERS

BACKGROUND OF THE INVENTION

1. Field of the Invention

The present invention relates generally to adjustable molds, and particularly to such molds that are rapidly adjustable to form containers of various sizes.

2. Description of the Prior Art

The prior art is replete with adjustable casting and molding devices adapted to form a wide variety of objects. Examples may be found in the following prior-art patents:

U.S. Pat. No. 3,002,250—Discloses an adjustable frame for casting concrete members of various sizes using adjustably interconnected standard-size frame elements.

U.S. Pat. No. 3,635,642—Discloses a flexible molding device, including flexible magnetic wall elements, for molding various sizes and shapes of articles.

U.S. Pat. No. 4,156,516—Discloses several flexible molding schemes, each including flexible sidewall sections and means for connecting them to each other and to a rigid bottom wall, for molding various sizes and shapes of articles.

U.S. Pat. No. 4,637,789—Discloses an adjustable frame for molding plastic objects of various sizes using adjustably interconnected frame sections.

While the above devices have proven useful for their stated purposes, there has remained a persistent need for a mold which is rapidly adjustable to form containers of various sizes.

SUMMARY OF THE INVENTION

Accordingly, a primary object of this invention is to meet the foregoing need for such a rapidly adjustable mold. Another object is to fill that need in an economical and cost-effective manner. Those and other objects have been achieved by the invention herein claimed.

This invention finds particular utility in a rapidly adjustable mold that is adapted for transforming a heated plastic sheet into a rectangular container. The mold comprises a bottom wall and four moveable sidewalls which together define a variable rectangular cavity for receiving the plastic sheet and forming it into the desired container. The bottom wall has a substantially horizontal upper surface and first and second substantially vertical side edges that intersect each other perpendicularly to define a right-angle corner. All four sidewalls are substantially vertical.

The first sidewall has an end disposed at the right-angle corner and a side extending therefrom alongside the first side edge. The first sidewall is vertically moveable relative to the bottom wall, so that its side is moveable upward and downward relative to the bottom wall upper surface. The second sidewall has an end and a side extending therefrom alongside the second side edge at least to the first sidewall end. The second sidewall likewise is vertically moveable relative to the bottom wall, so that its side is moveable upward and downward relative to the bottom wall upper surface. The second sidewall also is horizontally moveable relative to the bottom wall, so that its end is moveable toward and away from the first sidewall end.

The third sidewall has an end and a side extending therefrom parallel with the first sidewall side at least to the second sidewall end. The third sidewall side extends vertically upward from the bottom wall upper surface. The third sidewall is horizontally moveable relative to the bottom wall, so that its end is moveable toward and away from the second sidewall end, and so that its side is moveable toward and away from the first sidewall side. The fourth sidewall has an end disposed at the first side edge and a side extending therefrom parallel with the second sidewall side at least to the third sidewall end. The fourth sidewall side likewise extends vertically upward from the bottom wall upper surface. The fourth sidewall is horizontally moveable relative to the bottom wall, so that its side is moveable toward and away from the second sidewall side.

This invention, and its objects and advantages, will become more apparent in the detailed description of its preferred embodiment presented hereinbelow.

BRIEF DESCRIPTION OF THE DRAWINGS

In the detailed description of the preferred embodiment of this invention presented below, reference is made to the accompanying drawings, wherein like reference numerals denote like elements, and wherein:

FIGS. 1 and 2 are top-plan and cross-sectional views, respectively, illustrating an adjustable mold constructed in accordance with the preferred embodiment of this invention and adjusted to form a medium-size rectangular container, FIG. 2 being taken along line 2—2 in FIG. 1;

FIGS. 5, 6, and 7 are schematic side-elevation, top-plan, and cross-sectional views, respectively, depicting use of the mold of FIGS. 1-4 in a manufacturing process, FIG. 7 being taken along line 7—7 in FIG. 6.

DESCRIPTION OF THE PREFERRED EMBODIMENT

Because certain parts of adjustable molds are well known, the following description is directed in particular to those elements forming, cooperating directly with, or relating to, the present invention. Elements not specifically shown or described here are selectable from those known in the pertinent art.

Figure 3:
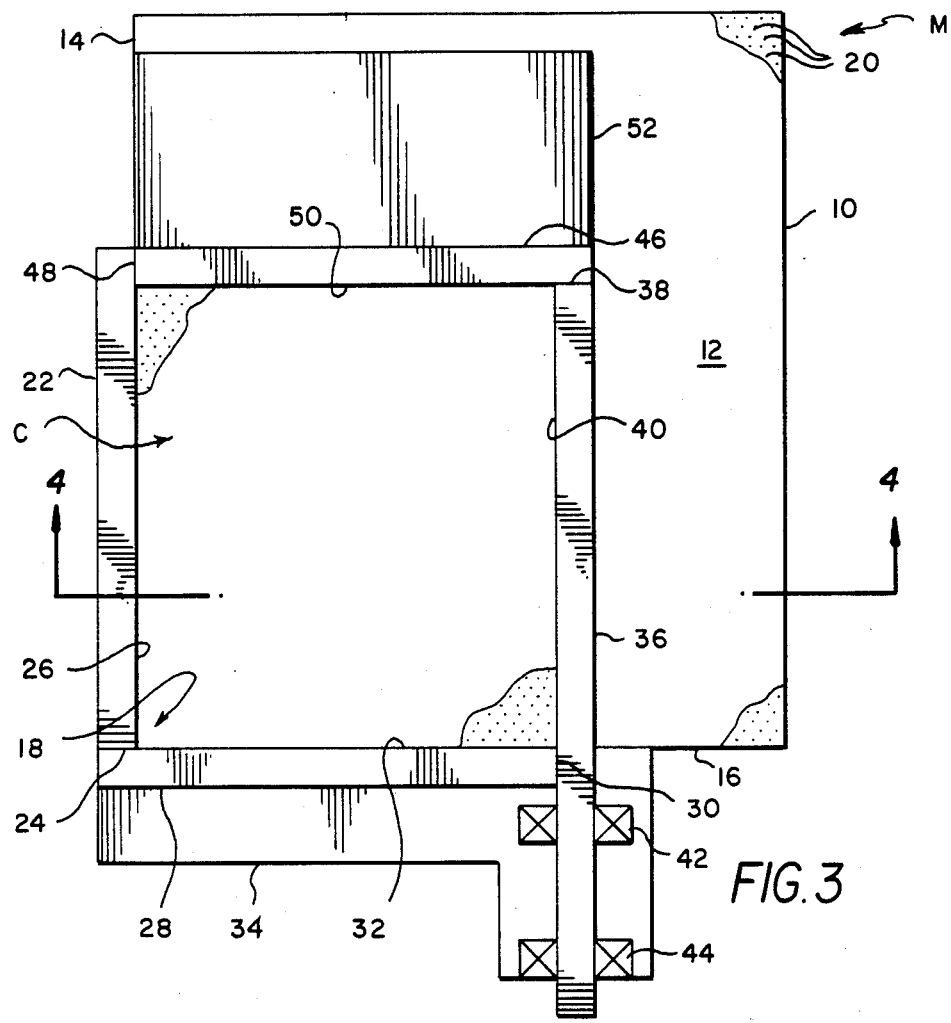
FIGS. 3 and 4 are top-plan and cross-sectional views, respectively, showing the adjustable mold of FIGS. 1-2 as adjusted to form a large-size rectangular container, FIG. 4 being taken along line 4—4 in FIG. 3.
Figure 4:
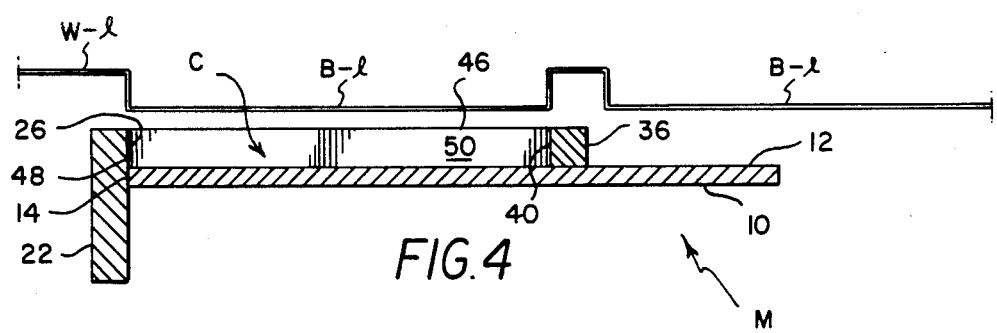

FIGS. 1-4 illustrate a rapidly adjustable mold M adapted to transform heated plastic sheet material into rectangular containers. FIGS. 1-2 show mold M as adjusted to form medium-size boxes B-m from a continuous heated plastic web W-m of suitable width. FIGS. 3-4 show mold M as adjusted to form large-size boxes B-l from a continuous heated plastic web W-l of appropriately greater width.

In general, mold M comprises a bottom wall and four orthogonally oriented, readily moveable sidewalls, which together define a mold cavity C that is rapidly adjustable to produce rectangular containers of various sizes and aspect ratios.

More particularly, the mold bottom wall 10 has a substantially horizontal upper surface 12 and first and second substantially vertical side edges 14 and 16, respectively, that intersect each other perpendicularly to define a right-angle corner 18. Bottom wall 10 is provided with perforations 20 for facilitating creation of a pressure differential on opposite surfaces of an operatively positioned heated plastic sheet. The four mold sidewalls are all substantially vertical and moveable relative to bottom wall 10.

The first substantially vertical sidewall 22 has an end 24 disposed at corner 18 and a side 26 extending therefrom alongside edge 14. Sidewall 22 is vertically moveable relative to bottom wall 10, so that side 26 thereof is moveable upward and downward relative to bottom wall upper surface 12. Sidewall 22 is horizontally stationary relative to bottom wall 10.

The second substantially vertical sidewall 28 has an end 30 disposed as shown and a side 32 extending therefrom alongside edge 16, at least to end 24. Sidewall 28 is vertically moveable relative to bottom wall 10, so that side 32 thereof is moveable upward and downward relative to bottom wall upper surface 12. For convenience, sidewalls 22 and 28 may be made vertically moveable together, relative to bottom wall 10, to ensure that their sides 26 and 32 extend upward to a common height above upper surface 12. Sidewall 28 also is horizontally moveable relative to bottom wall 10, so that end 30 thereof is moveable toward and away from end 24. Sidewall 28 is mounted on an actuatable member 34 so as to be moved thereby, both vertically and horizontally as aforesaid, relative to bottom wall 10.

The third substantially vertical sidewall 36 has an end 38 disposed as shown and a side 40 extending therefrom parallel with side 26, at least to end 30. Sidewall 36 is vertically stationary relative to bottom wall 10, its side 40 extending vertically upward from upper surface 12. Sidewall 36 is horizontally moveable relative to bottom wall 10, so that its end 38 is moveable toward and away from end 30, and so that its side 40 is moveable toward and away from side 26. For such horizontal movements, sidewall 36 is mounted so as to move relative to member 34 in directions parallel with sidewall 22, and to move along with member 34 in directions perpendicular to sidewall 22. Toward that end, sidewall 36 is shown slideably received in a pair of slide bearings 42 and 44 on member 34.

The fourth substantially vertical sidewall 46 has an end 48 disposed at edge 14 and a side 50 extending therefrom parallel with side 32, at least to end 38. Sidewall 46 is vertically stationary relative to bottom wall 10, its side 50 extending vertically upward from upper surface 12. Sidewall 46 is horizontally moveable relative to bottom wall 10, so that its side 50 is moveable toward and away from side 32. Sidewall 46 is mounted on an actuatable member 52 so as to be moved thereby, horizontally as just described, toward and away from sidewall 28. In connection with those movements, it will be noted that sidewall 36 is horizontally moveable along with member 52 in directions perpendicular to sidewall 28, and relative to member 52 in directions parallel with sidewall 28.

In addition to the foregoing, bottom wall 10 and sidewalls 22, 28, 36, and 46 interact as follows: (1) first sidewall end 24 slideably abuts second sidewall side 32, and first sidewall side 26 slideably abuts both bottom wall first side edge 14 and fourth sidewall end 48; (2) second sidewall end 30 slideably abuts third sidewall side 40, and second sidewall side 32 slideably abuts both bottom wall second side edge 16 and first sidewall end 24; (3) third sidewall end 38 slideably abuts fourth sidewall side 50, and third sidewall side 40 slideably abuts second sidewall end 30; and (4) fourth sidewall end 48 slideably abuts first sidewall side 26, and fourth sidewall side 50 slideably abuts third sidewall end 38.

It will thus be seen that, with suitably applied actuating forces, sidewalls 28, 36, and 46 of mold M can be moved horizontally so as to adjust the mold cavity for any length and width of rectangular container within the mold size range. Moreover, since sidewalls 36 and 46 are vertically stationary relative to bottom wall 10, they are mounted so as to be readily replaceable by substitute sidewalls which differ therefrom only in that their respective sides extend vertically upward from bottom wall upper surface 12 to a selected different height above surface 12. Sidewalls 22 and 28 can then be moved vertically, relative to bottom wall 10, until their sides extend upward to the same selected height. The mold cavity can thus be adjusted for any selected height of rectangular container within the mold size range.

In use, mold M is essentially well suited for rapid, automated production of rectangular plastic boxes of various sizes and aspect ratios. With mechanized drivers to actuate its sidewalls, the mold can be rapidly adjusted, between machine indexes if desired, in accordance with specified box dimensions. Two manufacturing processes exemplary of such use will now be described briefly with reference to the drawings.

The process illustrated schematically in FIGS. 5–7 is especially useful for producing large quantities of boxes within a relatively narrow range of box sizes. FIG. 5 depicts a production line 60 comprising a web feeding station 62, a heating station 64, a forming station 66, and a severing and trimming station 68. Feeding station 62 includes a plurality of rolls 70 for supplying continuous plastic webs 72 of different widths and/or thicknesses to a web diverter 74. A selected one of those webs is fed through diverter 74 to heating station 64, which includes a pair of heaters 76 that heat the selected web to an appropriate forming temperature. The heat-softened web is then fed to forming station 66 and positioned on pre-heated mold M (already adjusted for specified box size). With a pressure differential aided by vacuum applied through mold perforations 20 (see FIGS. 1 and 3), the web is drawn into mold cavity C and thermoformed into the desired box B. Upon completion of the forming step, the vacuum is discontinued and the formed box allowed to cool. With air pressure then forcibly applied through perforations 20, the box, still a part of the web whence it was formed, is raised from the mold cavity. FIGS. 2 and 4 show, respectively, boxes B-m and B-l (as formed from webs W-m and W-l) disposed above cavity C. From forming station 66 the box moves on to severing and trimming station 68, where it is first severed from the web by a transverse cutter 78 and then trimmed by a two-sided trimmer 80 (shown separately in FIGS. 6–7). Trimmer 80 includes a base plate 82, on which box B is operatively positioned, and an L-shaped cutter 84 adapted to trim two sides of the box simultaneously. When trimming of all four sides has been completed, the box is finished and ready for immediate use.

Figure 8:
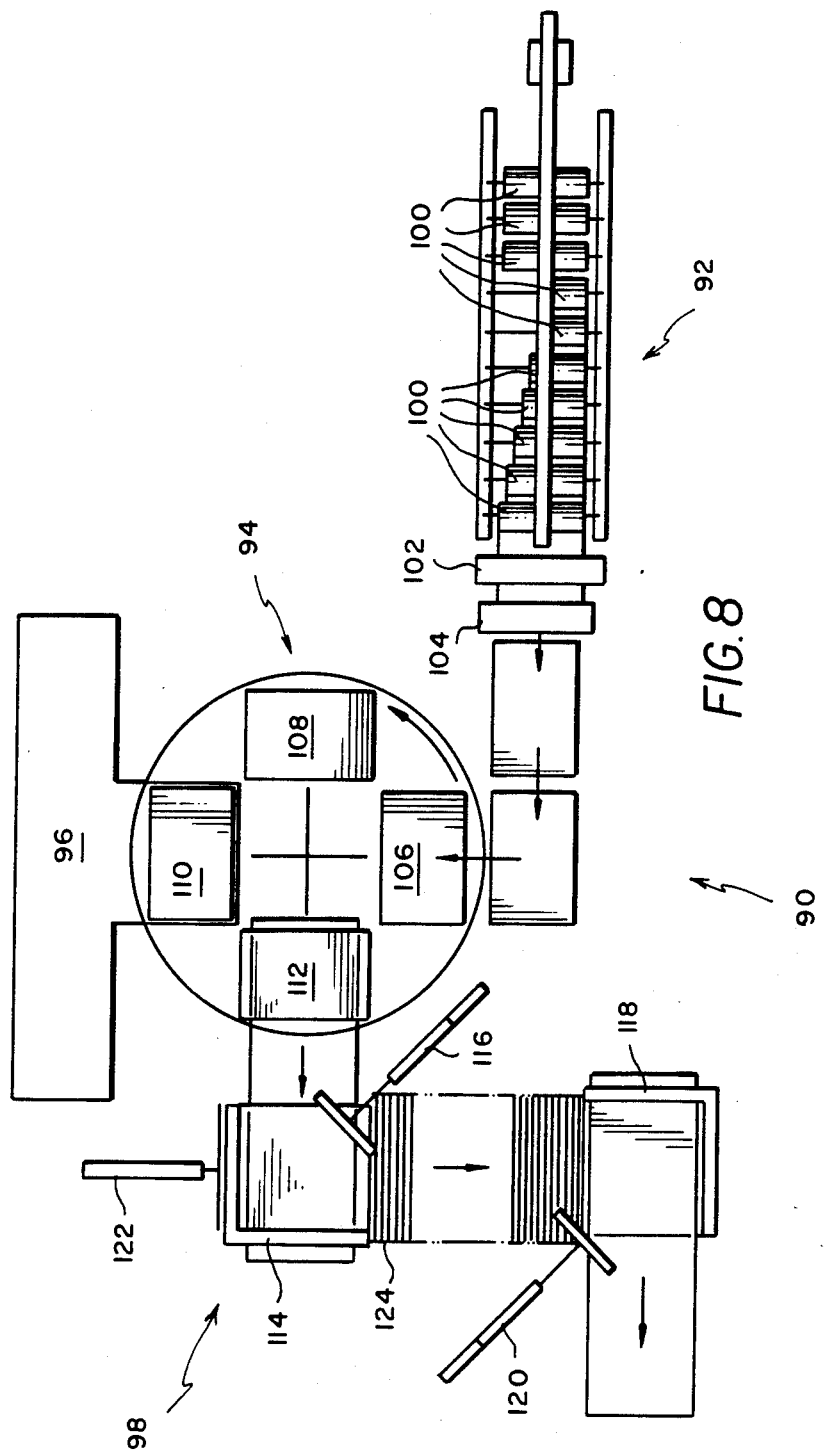
FIG. 8 is a schematic top-plan view showing use of the mold of FIGS. 1-4 in another manufacturing process.

The process illustrated schematically in FIG. 8 is similar in many respects to that just described, but is more useful for producing smaller quantities of boxes that range widely in size. FIG. 8 depicts a production line 90 comprising a sheet feeding station 92, a rotary thermoforming machine 94, a mold changing station 96, and a trimming station 98. Feeding station 92 includes a plurality of rolls 100, which supply continuous plastic webs of different widths and/or thicknesses to a web selector 102, and a web cutter 104 that cuts the selected web into individual plastic sheets of specified size for input to thermoforming machine 94. Machine 94 comprises a loading station 106 that receives plastic sheets from cutter 104, a heating station 108 that heats each sheet to its forming temperature, a forming station 110 where a pre-heated mold (like mold M in FIGS. 1-5) thermoforms each heat-softened sheet into the desired box, and an unloading station 112 from which the formed box is conveyed to trimming station 98. Mold changing station 96, located next to forming station 110, provides a convenient facility for replacing the mold therein with another mold of different size. Trimming station 98 includes a first trimmer 114, with an associated box positioner 116, for trimming two sides of the formed box; a second trimmer 118, with an associated positioner 120, for trimming the remaining two sides of that box; and a box actuator 122 and conveyor 124, for moving the box from trimmer 114 to trimmer 118. When trimming of all four sides has thus been accomplished, the box is finished and ready for use. The arrows shown in FIG. 8 indicate the path followed by each plastic sheet and formed box as it moves successively through the foregoing stations in this process.

The present invention has now been described in detail with particular reference to its preferred embodiment and exemplary uses thereof. It will be understood, however, that variations and modifications can be effected within the spirit and scope of this invention.

I claim:

1. An adjustable mold for transforming a heated plastic sheet into a rectangular container, said mold comprising:

a bottom wall having a substantially horizontal upper surface and first and second substantially vertical side edges perpendicularly intersecting each other to define a right-angle corner;

a first substantially vertical sidewall having an end at said corner and a side extending therefrom alongside said first side edge, said first sidewall being vertically moveable relative to said bottom wall so that said side thereof is moveable upward and downward relative to said upper surface;

a second substantially vertical sidewall having an end and a side extending therefrom alongside said second side edge at least to said first sidewall end, said second sidewall being vertically moveable relative to said bottom wall so that said side thereof is moveable upward and downward relative to said upper surface, said second sidewall being horizontally moveable relative to said bottom wall so that said end thereof is moveable toward and away from said first sidewall end;

a third substantially vertical sidewall having an end and a side extending therefrom parallel with said first sidewall side at least to said second sidewall end, said third sidewall side extending vertically upward from said upper surface, said third sidewall being horizontally moveable relative to said bottom wall so that said end thereof is moveable toward and away from said second sidewall end and so that said third sidewall side is moveable toward and away from said first sidewall side; and a fourth substantially vertical sidewall having an end at said first side edge and a side extending therefrom parallel with said second sidewall side at least to said third sidewall end, said fourth sidewall side extending vertically upward from said upper surface, said fourth sidewall being horizontally moveable relative to said bottom wall so that said side thereof is moveable toward and away from said second sidewall side;

wherein said first sidewall is horizontally stationary relative to said bottom wall, said first sidewall end slideably abuts said second sidewall side, and said first sidewall side slideably abuts said first side edge and said fourth sidewall end;

wherein said second sidewall end slideably abuts said third sidewall side, and said second sidewall side slideably abuts said second side edge and said first sidewall end;

wherein said third sidewall is vertically stationary relative to said bottom wall, said third sidewall end slideably abuts said fourth sidewall side, and said third sidewall side slideably abuts said second sidewall end;

wherein said fourth sidewall is vertically stationary relative to said bottom wall, said fourth sidewall end slideably abuts said first sidewall side, and said fourth sidewall side relatively abuts said third sidewall end; and wherein said second sidewall is rigidly mounted on an actuatable member for both horizontal and vertical movements therewith relative to said bottom wall, and said third sidewall is slidably mounted to said actuatable member for only horizontal movements relative to said bottom wall in a first direction along with said member toward and away from said first sidewall, and in a second direction relative to said member parallel with said first sidewall;

whereby said bottom wall and said sidewalls define a variable rectangular cavity for receiving the plastic sheet and forming it into the container.

2. An adjustable mold as claimed in claim 1 wherein said bottom wall includes perforations for facilitating creation of a pressure differential on opposite surfaces of the plastic sheet.

3. An adjustable mold as claimed in claim 1 wherein said fourth sidewall is mounted on an actuatable other member for horizontal movements therewith, relative to said bottom wall, toward and away from said second sidewall, and said third sidewall is horizontally moveable along with said other member in a direction perpendicular to said second sidewall, and relative to said other member in a direction parallel with said second sidewall.

4. An adjustable mold as claimed in claim 3 wherein said first and second sidewalls are vertically moveable together, relative to said bottom wall, so that said sides thereof extend upward to a common height above said upper surface.

5. An adjustable mold as claimed in claim 3 wherein said third and fourth sidewalls are removably mounted on said actuatable members so as to be readily replaceable by substitute sidewalls differing therefrom only in that their respective sides extend vertically upward from said upper surface to a selected different height above said surface.

6. An adjustable mold as claimed in claim 1 wherein said actuatable member includes slide bearing means for slideably supporting said third sidewall for said horizontal movements thereof.

* * * * *